United States Patent
Verdegaal et al.

(10) Patent No.: US 6,576,142 B2
(45) Date of Patent: Jun. 10, 2003

(54) METHOD OF TREATING AGRICULTURAL EQUIPMENT, ALLEYS AND LAGOONS IN CONFINED ANIMAL FEEDING OPERATIONS

(76) Inventors: Russell J. Verdegaal, 13555 S. 11th Ave., Hanford, CA (US) 93230; George F. Verdegaal, Jr., 13555 S. 11th Ave., Hanford, CA (US) 93230

( * ) Notice: Subject to any disclaimer, the term of this patent is extended or adjusted under 35 U.S.C. 154(b) by 0 days.

(21) Appl. No.: 10/123,345

(22) Filed: Apr. 15, 2002

(65) Prior Publication Data

US 2002/0121486 A1 Sep. 5, 2002

Related U.S. Application Data

(63) Continuation of application No. 09/618,583, filed on Jul. 17, 2000, now Pat. No. 6,372,146.

(51) Int. Cl.[7] .................................................. C02F 7/06
(52) U.S. Cl. ........................................................ 210/747
(58) Field of Search .............................. 210/743, 747, 210/749, 765, 916

(56) References Cited

U.S. PATENT DOCUMENTS 4,018,899 A * 4/1977 Seckler et al.
5,890,454 A * 4/1999 Moore et al.
6,054,044 A * 4/2000 Hoffland et al.
6,261,459 B1 * 7/2001 Waldmann

* cited by examiner

Primary Examiner—Betsey Morrison Hoey
(74) Attorney, Agent, or Firm—Richard A. Ryan

(57) ABSTRACT

Methods for treating manure treatment systems in confined animal feeding operations to maintain the agricultural equipment, alleys and lagoons in a safer and more effective and useable condition though the use of a sulfuric acid composition. Sulfuric acid mixed with urea is controllably released from a storage tank, through an injection pump and into the fluid line transporting recirculation water from the lagoon to flush livestock alleys with the composition and maintain the pH of the lagoon fluid at approximately 6.5 to 7.0. The composition can also be placed into the fluid line transporting flush water from the livestock alleys to clean the manure separator. The composition can also be sprayed onto the manure separator screens to clean the screens. The composition can be placed directly onto the floor of the concrete alley and allowed to soak thereon to remove accumulated manure, algae and other materials.

25 Claims, 4 Drawing Sheets

METHOD OF TREATING AGRICULTURAL EQUIPMENT, ALLEYS AND LAGOONS IN CONFINED ANIMAL FEEDING OPERATIONS

CROSS-REFERENCE TO RELATED APPLICATIONS

This application is a continuing application of U.S. patent application Ser. No. 09/618,583 filed Jul. 17, 2000, now U.S. Pat. No. 6,372,146, issued Apr. 16, 2002.

BACKGROUND OF THE INVENTION

A. Field of the Invention

The field of the present invention relates generally to methods of treating agricultural equipment, alleys and lagoons to improve the effectiveness of the equipment, safety of the alleys and quality of the water stored in the lagoons and used therefrom. More specifically, this invention relates to methods of utilizing sulfuric acid and sulfuric acid compounds to treat agricultural equipment, alleys and lagoons used in confined animal feeding operations.

B. Background

It is well known that the storage and treatment of manure and management of manure in confined animal feeding operations, such as those used for dairy, poultry and swine is one of the most difficult, expensive and potentially limiting problems facing the agricultural industry today. Animal excrement, in the form of manure, contains high amounts of nitrates and other chemical constituents such as salts, much of which derives from the animal feed, that make such manure undesirable for contact with fresh water sources, such as rivers and underground aquifers, and difficult to treat or remove once it contaminates fresh water. As a result, manure management is an important task for every confined animal feeding operation and can require a significant amount of resources, including labor, land, equipment and financial resources.

In one increasingly popular method of operation, manure handling in confined animal feeding operations consists of a hydraulic flushing system that flushes the animal manure from the animal holding area, typically having concrete alleys and walkways, to deliver the manure, as a slurry, to a storage area where the water is stored and then utilized for irrigation. Often, a portion of the water from the storage area is utilized for recirculation through the waste handling system to clean the alleys and various agricultural equipment. The storage areas for animal waste handling systems are usually lagoons, ponds, pits and similar surface storage areas (collectively, referred to as "lagoons") that are located on or near the agricultural property on which the manure is generated. Is also common for the manure from the lagoon to be used to irrigate agricultural crops, typically after being mixed with four to five parts of fresh water for every one part of recycled water.

The manure from livestock operations is comprised of the dry feed matter that is fed to livestock and the nutrients associated with that feed matter, including magnesium phosphate and calcium phosphate. This material ends up in the manure handling and treatment system where the high solids and nutrients content causes problems, particularly in the associated agricultural equipment, alleys in the holding area and lagoons. The high solids content results in sludge buildup on the equipment and alleys and lagoon. The sludge buildup also impacts the ability of the pumps to pump fluid from the lagoon and the solids material can plug equipment utilized in the manure handling system, including screens, separators and other equipment. When used to rinse the alleys in the animal holding areas, these materials can create conditions unsafe (i.e., slippery) for the animals. In the lagoon, the solids materials take up space in the lagoon that needs to be used to store water.

In addition, if the irrigation water that is taken from the lagoon contains high solids content, then this material can hinder crop seed germination and growth. If not managed properly, the high nutrient content of the lagoon water will overload the land with nutrients, particularly nitrogen, which can contaminate groundwater or surface water resources. Salts in the lagoon water can seal the soil, causing drainage and crop growing problems, including toxicity to plants. Odors and gases produced during the decomposition of the manure and other materials in the lagoon can adversely impact air quality and be a nuisance to neighbors who live downwind. As a result, there is continuing demand for livestock producers and handlers to improve their animal manure management practices to develop best management practices ("BMP") to minimize the impact of their livestock operations on the environment and their neighbors.

To improve the operation and efficiency of the manure handling system, most livestock operators utilize one or more waste treatment methods as part of a manure treatment system, such as manure separators, biological materials, flush water, mechanical excavation and slurry spreading. When they function properly, manure separators utilize screens to separate out a portion of the solid materials from the manure slurry prior to the slurry reaching the lagoon. The solid material separated out by the separator is hauled away for fertilizer and used as bedding for animals in free stall barns. Over time, the separator screens and the piping associated with the flushing system can become plugged with precipitate and waste materials. A common form of the precipitate found in the manure handling systems of confined animal feeding operations is struvite, having a chemical composition made up of oxygen, phosphorus, magnesium, hydrogen and nitrogen. As is well know in confined animal feeding operations, struvite build-up in the piping system and flow lines can severely limit the flow capacity of the lines and the pressure available for use to clean the manure handling system. Typically, the struvite build-up occurs over a period of time in the flush lines. This is dependant upon the diet that is fed to the animals and the quality of the water flowing through the lines.

A number of livestock operators favor a biological solution to the foregoing manure handling problems, requiring the introduction of microbes into the lagoon to facilitate a biological breakdown of the solid and liquid nutrient materials stored in the lagoon. Biological agents are costly and can be sensitive to changing conditions. Under some circumstances, the quality of the lagoon can be improved by the addition of fresh water to change its chemical balance. Typically, even with the various treatment methods, mechanical excavation is periodically required when the capacity of the lagoon is diminished to the point where storage capacity and effective treatment are severely impacted. In addition to the excavation, this method of treatment results in additional expense for disposal of the excavated materials. As an alternative, under the right circumstances the livestock operator can pump out excess manure slurry and spread the slurry on agricultural lands utilizing liquid manure trucks. The spreading of slurry requires consideration of the content of the slurry (i.e., percent of nitrogen), the impact of that content on the crops, the amount of material that can be safely and effectively applied to the agricultural land and soil compaction from the trucks driving on the fields while spreading the slurry.

Even with the availability of the foregoing waste treatment methods, a number of problems still exist. For instance, many confined animal feeding operations, particularly in the dairy industry, utilize concrete alleys or lanes which confine and transport the animal manure, both liquid and solid. These alleys are flushed several times a day with recirculating water from the lagoon. The nutrients in the manure can cause bacteria and/or algae growth to accumulate on the concrete alley walkways and cause an animal to slip and fall, which can result in injury or death for the animal. In addition, the pipes carrying the recirculating fluid to and from the lagoon to flush the concrete lanes can become so clogged with struvite, the precipitate material comprising magnesium phosphate and calcium phosphate, and entrapped manure, that the flush system must be operated over much longer periods of time in order to properly flush the alleys of manure. Various tests and a review of research literature has determined that the struvite precipitate material is adaptable for removal with sulfuric acid.

Sulfuric acid is one of the most commonly used and readily available industrial chemicals in the United States. In the agricultural industry, sulfuric acid has a number of uses. Among these is the use of sulfuric acid on soils in open fields, orchards and vineyards to treat high pH soils and those soils having a high free lime or calcium carbonate content. Soils high in sodium, or sodic soils, are also treated with sulfuric acid. Sulfuric acid is also utilized to treat irrigation wells and various piping systems to remove calcium deposits that are plugging the well perforations or the interior of the pipe, thereby preventing the free flow or movement of water. In some instances, such as when high pH and high bicarbonate waters are used, sulfuric acid is injected into the irrigation system in very controlled rates to buffer high pH irrigation water and improve irrigation system water quality. A major limitation with the use of sulfuric acid is its well known corrosive and hazardous nature, requiring sulfuric acid to be handled with great care by trained individuals wearing personal protective equipment and with specialized equipment to avoid injury to persons and damage to equipment. Because of these characteristics, relatively pure sulfuric acid is not typically used as an agricultural amendment.

Some of the dangers and need for specialized equipment when dealing with sulfuric acid can be significantly reduced by mixing other materials with the sulfuric acid. Because of the highly volatile nature of sulfuric acid, care must be taken is selecting such materials. One such material is Urea. As set forth in U.S. Pat. No. 4,310,343 to Verdegaal et al., sulfuric acid can be combined with Urea to provide a substance that is safer and easier to handle and which requires less sophisticated equipment. The sulfuric acid and urea composition can be used in place of the relatively pure sulfuric acid commonly used in the agricultural industry.

The above-described conventional methods of treating agricultural lagoons are somewhat expensive, not entirely successful, limited due to by-product handling and relatively manpower intensive. In addition, these methods do not generally address the problems associated with the buildup of precipitate materials in the flush system pipes, manure separators or algae/bacteria on the concrete alleys. What is needed is an effective method of treating agricultural water storage lagoons in confined animal feeding operations at a lower cost and with minimum by-product production and manpower requirements and which are capable of reducing precipitate buildup in pipes and algae or bacterial buildup on concrete alleys. In other words, what is needed is manure management system to perform preventative maintenance for preventing a lagoon system from developing the foregoing described problems.

SUMMARY OF THE INVENTION

The method of treating agricultural equipment, alleys and lagoons in confined animal feeding operations of the present invention solves the problems identified above. That is to say, the present invention discloses a agricultural lagoon treating method that maintains the lagoon and lagoon water in a more useable condition without requiring excessive costs or manpower and without resulting in additional unwanted by-products that must be separately disposed. The recirculating flush fluid from the lagoon also reduces or eliminates precipitate buildup in pipes and the buildup of algae or bacteria on concrete livestock alleys. The present invention provides methods for cleaning manure separators and screens used thereon. In addition, the present invention provides a method for cleaning alleys by spraying a sulfuric acid composition on the alley and letting it soak in place to clean the concrete alley floor. As such, the method of the present invention is particularly suited for small or large confined animal feeding operations that have animal manure handling systems.

The preferred embodiment of the present invention utilizes a composition comprising sulfuric acid that is controllably released from a storage tank under pressure into a fluid line transporting recirculation water from the agricultural lagoon to the livestock alleys to maintain the pH of the lagoon fluid at approximately 6.5 to 7.0, slightly acidic to neutral. In the preferred embodiment, the composition comprises sulfuric acid mixed with urea to reduce the problems associated with the use of relatively pure sulfuric acid. A sulfuric acid injection pump injects the sulfuric acid composition into the fluid line through a sulfuric acid suitable pressure line and a fluid injector at a rate necessary to maintain the water in the flush line at the desired pH range. The fluid injector injects the acid at or near the center of the water stream in the fluid line. A backflow prevention device, connected to the injector, prevents water from backing up into the acid pressure line.

If the livestock operator has a manure treating system that has been in use for some time and it is having problems, it may be desirable to pre-treat or "shock" the system with sulfuric acid by injecting the acid at the manure entry point into the lagoon to lower the pH to a level lower than what would be necessary for usual maintenance of the system. For instance, if at the time of initiating the acidification process there has been buildup of precipitate material in the fluid lines, solid manure in the lagoon and manure separators and/or bacteria and/or algae growth on the concrete alleys used in the manure handling system, it may be desirable to flush the system with fluid having a pH lower than 6.5 to remove the buildup. Once the pipes, alleys and other components of the system are in a relatively clean condition, then the pH level can be adjusted to be in the desired 6.5 and 7.0 range.

The use of the method of the present invention in confined animal feeding operations may reduce or eliminate the need for the addition of microbes to the lagoon water and the mechanical excavation of the lagoon, thereby reducing operating expenses. The use of sulfuric acid to adjust the pH of the lagoon fluid enhances the breakdown of the manure solids in the lagoon and the efficiency of the manure separator. The manure flowing from the livestock alleys is broken down and placed in suspension, making it easier to transport through pipes and pumps and to use as irrigation water without plugging irrigation valves and other equipment, making it more desirable for re-use. In addition, manure separators will operate more efficiently. In anaerobic conditions and low temperatures, the odors emanating from the lagoon will be increased, primarily from the increased formation of hydrogen sulfide. However, hydrogen sulfide formation can be mitigated by increasing the dissolved oxygen level in the lagoon. This can be accomplished by the introduction of fresh water and/or circulation and aeration of the lagoon.

Accordingly, the primary objective of the present invention is to provide a method of treating agricultural lagoons in confined animal feeding operations that utilizes a composition of sulfuric acid and urea to clean and prevent precipitate buildup in fluid lines and on the concrete surfaces of the livestock alleys and prevent sludge buildup in the lagoon of an agricultural manure handling system without damaging the pipes, equipment and alleys of that system.

It is also an important objective of the present invention to provide a method of treating agricultural equipment utilized in confined animal feeding operations that injects a composition comprising sulfuric acid into the flush fluid flowing in the fluid line upstream of the manure separator to clean the separator and treat the lagoon where the composition is flushed.

It is also an important objective of the present invention to provide a method of treating agricultural equipment utilized in confined animal feeding operations that sprays a composition of sulfuric acid onto the screens of a manure separator to clean the screens and treat the lagoon where the composition is flushed.

It is also an objective of the present invention to provide a method of treating a livestock alley in a confined animal feeding operation that sprays or flows a composition of sulfuric acid onto the livestock alley to clean the alley of manure and algae.

The above and other objectives of the present invention will be explained in greater detail by reference to the description of the preferred embodiment and the attached figures. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION

Figure 1:
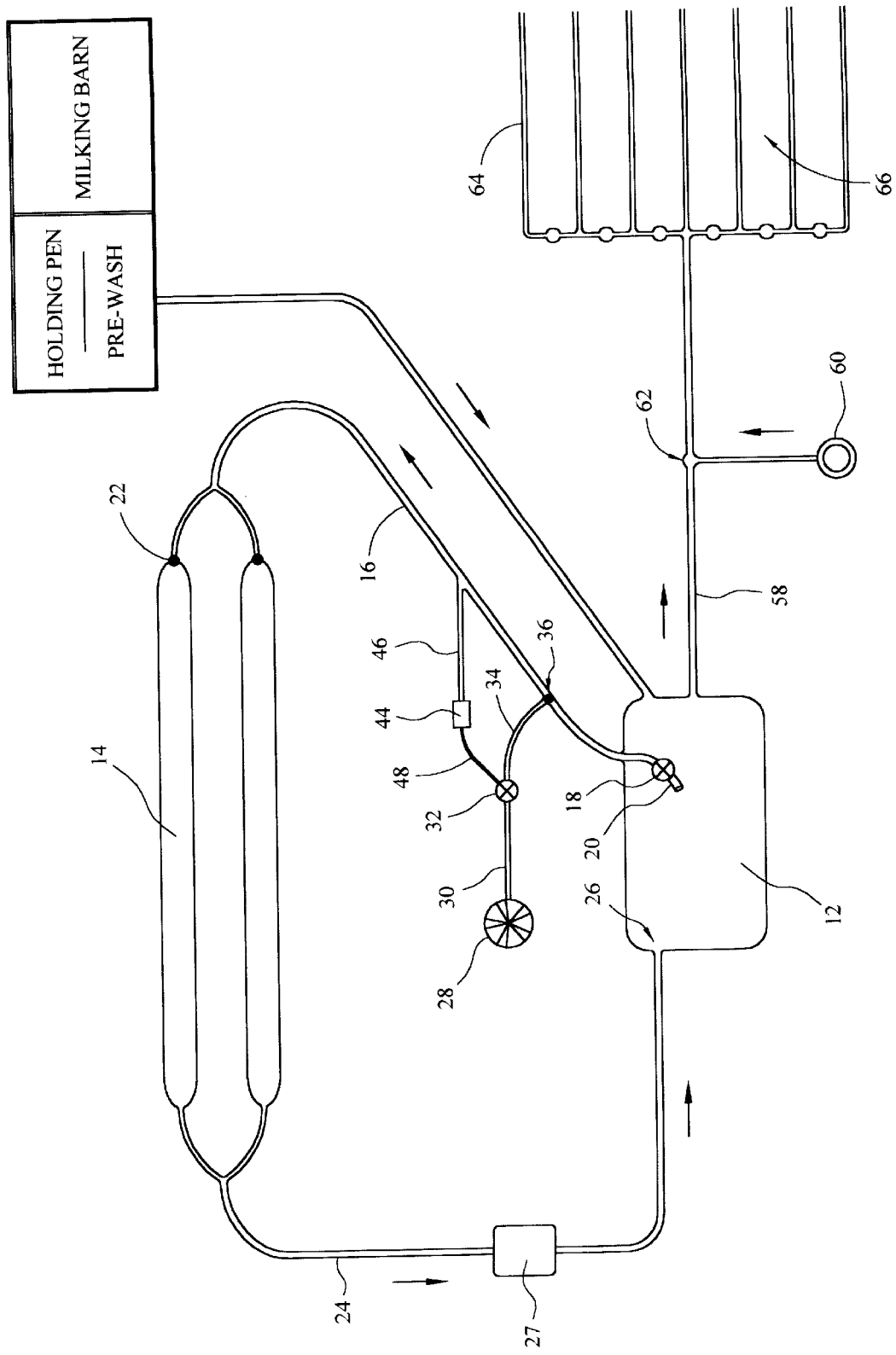
FIG. 1 is a plan view of the components of the method of the primary embodiment of the present invention.

With reference to the figures where like elements have been given like numerical designations to facilitate the reader's understanding of the present invention, and particularly with reference to the embodiment of the present invention illustrated in FIGS. 1 and 2, the preferred embodiment of the present invention is set forth below. FIG. 1 illustrates the plan view of the method of the present invention, designated generally as 10, to treat an agricultural lagoon and the manure treatment system of a confined animal feeding operation. A typical agricultural lagoon and manure treatment system in a confined animal feeding operation generally comprises lagoon 12, one or more livestock alleys 14 and fluid line 16 disposed between lagoon 12 and alleys 14. The lagoon 12, also referred to as a pit, pond or the like, is typically an open pit-like area on or near an agricultural operation, such as a dairy, swine or poultry operation, that is dug out of the ground for storing excess water and animal manure. Typically, such agricultural lagoons are unlined. In some circumstances lagoon 12 will be lined to prevent the intrusion of material from lagoon 12 into nearby underground or surface water supplies. For example, in California the sides and bottom are required to be composed of at least 10% clay. The liquid slurry in lagoon 12 is generally comprised of water and animal manure, unprocessed feed materials and nutrients from the feed materials that have not been processed by the digestive tract of the livestock. The manure and other materials can result in sludge buildup in lagoon 12 and a reduction in the volume of water available from the lagoon 12.

The livestock alleys 14 are generally concrete, asphalt or other relatively hard surface lined areas where the livestock are held and manure is collected. The use of such alleys 14 allow the agricultural operation to more efficiently collect and move the manure to locations, such as lagoon 12, for storage. Fluid line 16 delivers fluid from lagoon 12 under pressure, usually via pump 18 having intake 20, to hydraulic valves 22 at the beginning of livestock alleys 14 for flushing the liquid and dry manure from the livestock alleys 14 to lagoon 12. Typically, the alleys 14 are sloped downward, such as a one-half to five degree slope, to facilitate flushing of the manure from the livestock holding areas. As shown in FIG. 1, flush fluid transports the liquid and dry manure back to lagoon 12 from alleys 14 via a single aqueduct 24, which can be an open, lined channel or a pipe, having outlet 26 at lagoon 12. Generally, the fluid used for flushing alleys 14 is water that is at least partially reclaimed, such as through natural or induced biological processes, to be devoid of major solid materials from lagoon 12 and recirculated to alleys 14 through line 16. Unfortunately, the hard surface alleys 14 can develop a layer of bacteria or algae on top that can cause the cows or other animals to fall, resulting in injury and loss of livestock. In addition, the nutrients and other materials typically found in the fluid from lagoon 12 can precipitate (i.e., form struvite) and result in clogging of fluid lines 16 and 24, thereby reducing the water volume available at alleys 14 and necessitating flushing much longer. This results in higher operating and expense costs for the manure handling system due to higher electrical usage, excessive water usage and reduced efficiency.

To reduce or eliminate the problems of precipitate and manure buildup in lines 16 and 24, on the surface of alleys 14 and in manure separator 27 and the sludge and water quality problems with the fluid in lagoon 12, the method of the treating agricultural lagoons and manure treatment systems of the present invention 10 utilizes a storage tank 28, such as a sulfuric acid storage tank, for storing a composition comprising sulfuric acid. In one embodiment of the present invention, the sulfuric acid is relatively pure, such as 93 to 98 percent pure sulfuric acid. In the preferred embodiment of the present invention, the sulfuric acid composition also comprises urea. Significant care should be taken when combining sulfuric acid and urea (as set forth in U.S. Pat. No. 4,310,343). The sulfuric acid and urea composition is much less dangerous to handle and will require less sophisticated (i.e., specially designed and made out of special materials) equipment than if relatively pure sulfuric acid is used.

For convenience purposes, storage tank 28 should be located near lagoon 12. A sulfuric acid hose or line 30 connects sulfuric acid injection pump 32 with tank 28. A sulfuric acid pressure hose or line 34 connects pump 32 with fluid line 16 utilizing special connections that are not affected by the sulfuric acid composition under pressure, as are commonly known by those in the sulfuric acid handling profession. Pump 32 can be set to pump a set quantity of the sulfuric acid composition or can be adaptable to pump varying amounts of acid as needed to maintain the system in the desired condition. Once pumped from pump 32 through pressure line 34, the acid composition is mixed with the fluid in fluid line 16 to break down any struvite or other precipitates in line 16 or 24, improve efficiency of manure separator 27, and improve the water quality for delivery to alleys 14 and then to lagoon 12. The storage tank 28, hoses or lines 30 and 34, and pump 32 should made out of materials suitable for handling the sulfuric acid composition under pressure (i.e., downstream of pump 32) and be rated to be able to operate under conditions typically encountered outside in various agricultural areas. Because the composition is not as difficult to handle as relatively pure sulfuric acid, the use of the specialized equipment and special handling procedures can be reduced or, for some equipment, eliminated. If desired, the pump 32 and lines 30 and 34 can be housed in a housing of some type to protect them from the outside elements. Alternatively, lines 30 and 34 can be buried. In addition, lines 30 and 34 can be placed inside a secondary protective tubing for added safety and security.

Figure 2:
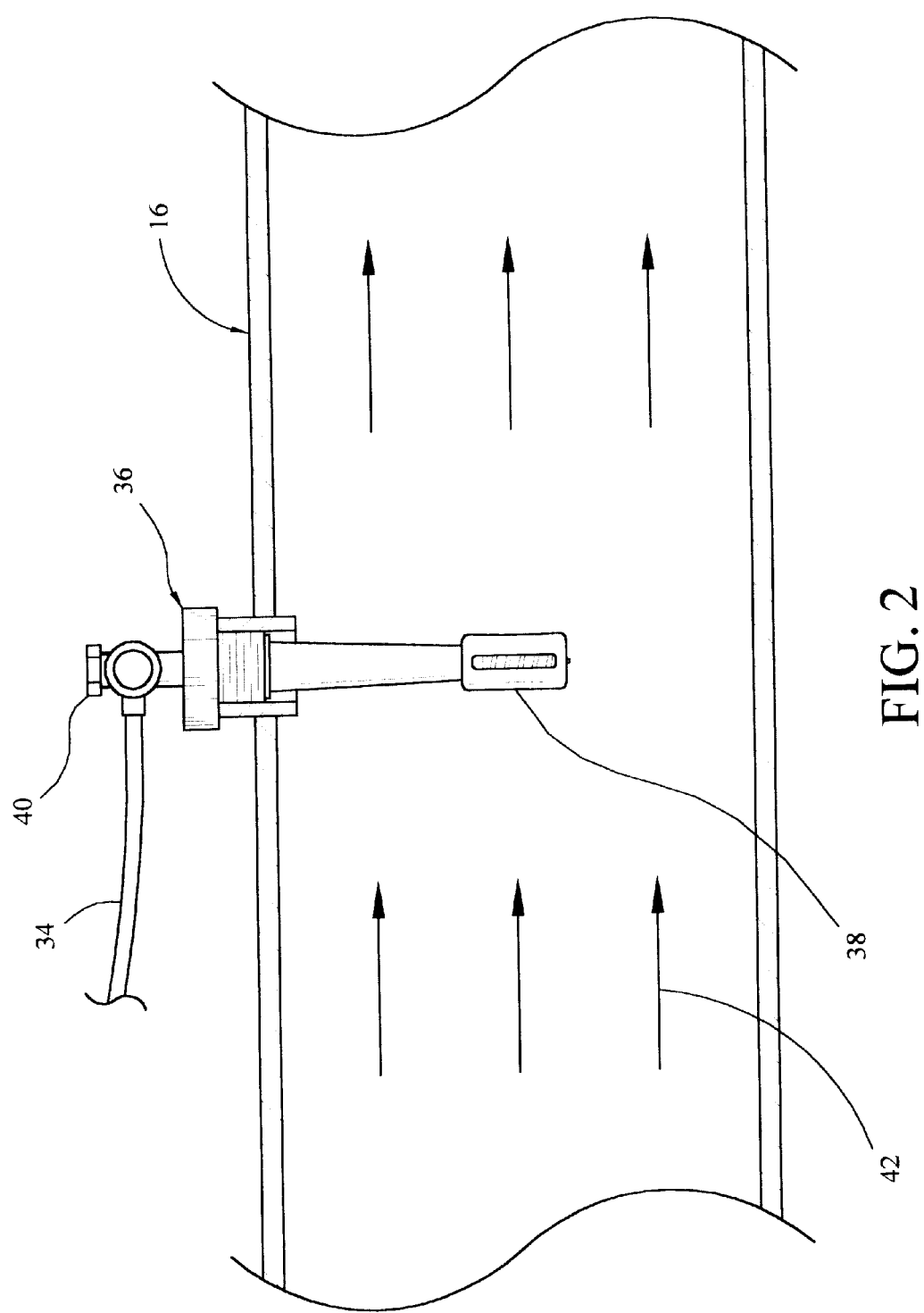
FIG. 2 is an isolated side view of the injector and backflow valve of the present invention.

In the preferred embodiment, as shown in FIG. 2, the method of the present invention 10 utilizes a injector mechanism 36 that includes an injector 38 and backflow prevention valve 40. The injector 38 facilitates the injection of the sulfuric acid composition into fluid line 16. Because the sulfuric acid composition is corrosive, it can damage fluid line 16, depending on the materials from which it is made. To reduce the likelihood of damaging fluid line 16, the use of injector 38 allows the sulfuric acid composition to be injected into or near the center of the stream of fluid, shown as 42 in FIG. 2. By injecting the sulfuric acid composition at or near the center of fluid stream 42, the composition can more effectively mix and be diluted with the fluid in fluid line 16 to remove or prevent precipitate formation in line 16 and for delivery to alleys 14 and then lagoon 12. When flushed or otherwise placed on alleys 14, the mixture of the flush fluid and sulfuric acid has demonstrated that it will kill and remove, as a result of lowering the pH, any pH-sensitive bacteria or algae on the surface of alley 14 and prevent future formation of such material. In addition, the acid-containing flush fluid will clean the etchings typically used in the concrete surface of alley 14 (the etchings are intentionally placed in the concrete to provide better footing for the animals). In lagoon 12, the mixture of the flush fluid and sulfuric acid will prevent solid manure build-up and improve biological activity to make the water stored therein more useable and manageable for irrigating crops.

One requirement for the efficient operation of the method of the present invention 10, is that the livestock operator should monitor the pH of the system and inject the sulfuric acid composition on an as needed basis (i.e., intermittent injection). Continuous injection may be necessary when pump 18 is operating, as activated by a timer. In the preferred embodiment, as shown in FIG. 1, the operator will monitor the pH of the flush alleys 14 when the system is operating to check for a pH of approximately 6.5 to 7.0, slightly acidic to neutral, to prevent formation of sludge and other undesirable problems. In addition, the pH of the flush fluid cannot be allowed to become too low, otherwise it could harm the concrete alleys and other materials and/or equipment or the livestock. The operator can take periodic, i.e., daily to weekly, measurements of the water flowing through flush alleys 14 to ensure the pH level is as desired. Normally, the operator of the confined animal feeding operation, or someone on its behalf, will check the pH with a hand-held pH meter. Alternatively, the operator can utilize a pH monitoring system having an electronic analyzer 44, as shown in FIG. 1, connected to fluid line 16 via analyzer intake pipe or line 46 to electronically measure the pH of the fluid flowing through line 16. Electrical line 48 can interconnect analyzer 44 and pump 32 so that a signal can be sent to activate pump 32 when additional sulfuric acid composition is need to be injected into fluid line 16. If desired, analyzer 44 can monitor the pH level of lagoon 12 and determine the quantity of acid necessary to inject into fluid line 16 to achieve the desired pH level of lagoon 12 to obtain the desired results. In addition, analyzer 44 can be connected to a supply of fresh water via a water line 50, which connects to an underground water line, to permit the addition of fresh water to lagoon 12 if the pH becomes lower than the desired level or if additional water is necessary for use as a flush fluid.

To utilize the method of the present invention, as illustrated in FIGS. 1 and 2, sulfuric acid composition is stored in storage tank 28 and the operator of the confined animal feeding operation, or someone on its behalf, monitors the pH of flush alleys 14 and/or lagoon 12. When the pH rises above the desired level, the operator activates pump 32 to pump a quantity of the acid from tank 28 through lines 30 and 34 to the fluid line 16 where it will form a mixture with the stream of flush fluid 42 being transported in fluid line 16 to alleys 14 for flushing the surface of the alley 14. Alternatively, an analyzer 44 can continuously monitor the pH level of lagoon 12 and, when the pH reaches a predetermined level, activate pump 32 to pump the acid through lines 30 and 34 to alleys 14. After flushing, the mixture is transported through line 24 and manure separator 27 back to lagoon 12 where it is mixed with the fluid already stored in lagoon 12. The acid/fluid mixture will prevent precipitate build-up in fluid lines 16 and 24 and on alleys 14 and prevent sludge buildup in lagoon 12. In addition, any other treating equipment used by the livestock operator that is part of the confined animal feeding operation, such as manure separator 27, will benefit from the diluted sulfuric acid going through the system. The inventors have found that the use of the method of the present invention can improve the efficiency of the manure separator from 15% to 40% and improve its operation and lower costs by reducing the likelihood of the screen plugging. To reduce the likelihood of damage to lines, alleys and other facilities, the preferred method of the present invention includes a delay mechanism that initiates the flush system (i.e., sends flush fluid through the piping system and to the alleys) some amount of time before pump 32 begins pumping sulfuric acid into line 16. The inventors have found that a delay of approximately two minutes provides sufficient time for the system to become sufficiently filled with water from lagoon 12 to prevent harm from the sulfuric acid. Often the contact of the sulfuric acid-containing flush water with the manure in alleys 14 will result in the formation of carbon dioxide. It has been found that the formation of the carbon dioxide does not have any effect on the concrete unless the pH of the flush water becomes too low.

To prevent the formation of undesirable odors, such as the formation of hydrogen sulfide, it is necessary to maintain an appropriate (based on the circumstances) amount of dissolved oxygen in lagoon 12. After the initial "shock" treatment and the system stabilizes, the introduction of sulfuric acid will create a much more healthy environment for microbiological activity (i.e., microbes). The dissolved oxygen content of lagoon 12 can be increased and maintained by adding fresh water to lagoon 12 and/or the circulation or aeration of the water in lagoon 12 in order to expose the lagoon water to air and, consequently, dissolved oxygen. At properly maintained levels, the dissolved oxygen content of the lagoon water will be sufficient to prevent hydrogen sulfide formation.

Figure 3:
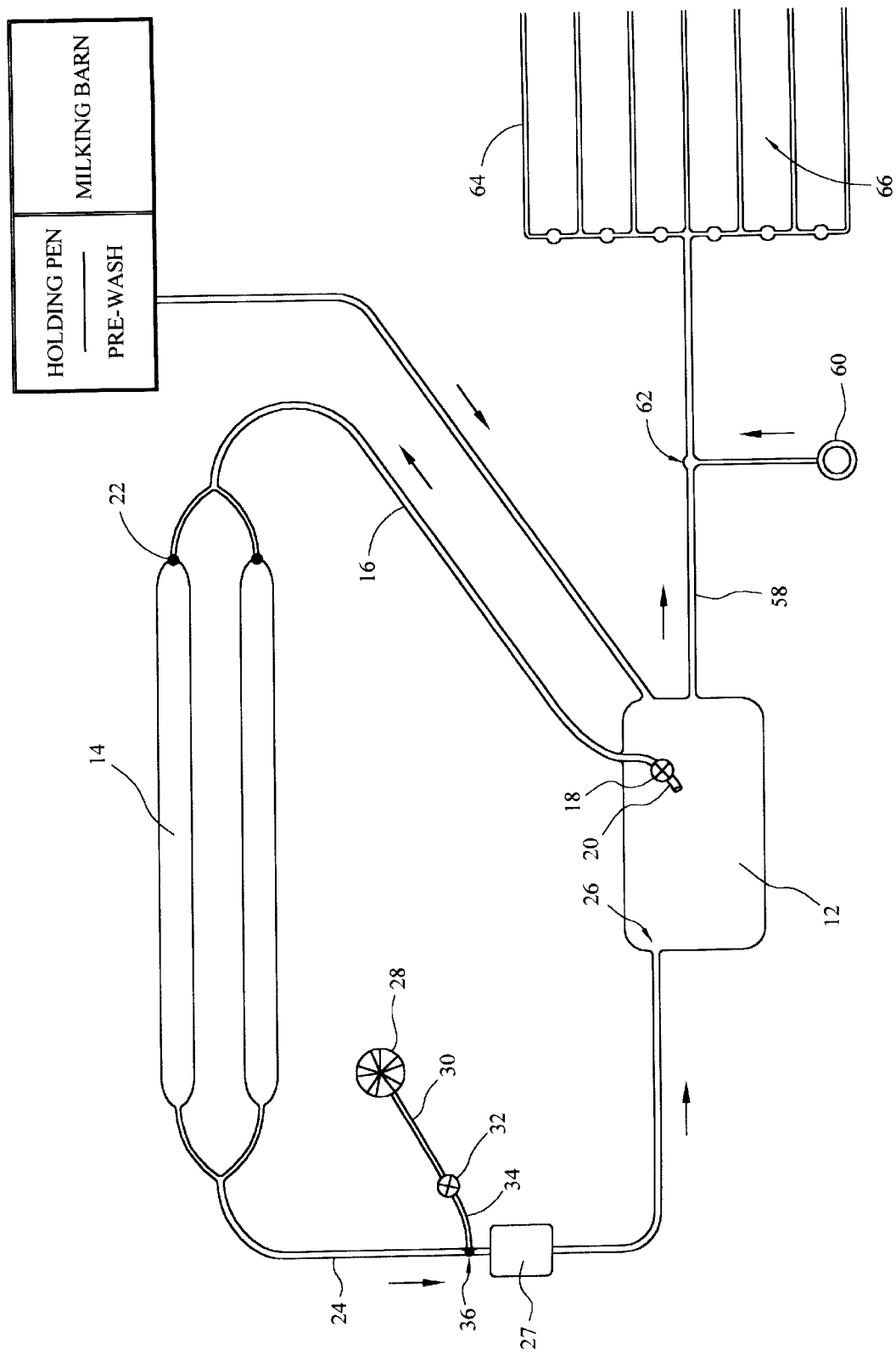
FIG. 3 is a plan view of the components of a method of treating the manure separator in an agricultural manure treatment system.

In the embodiment shown in FIG. 3, injector 36 is positioned just upstream of the manure separator 27 so that the sulfuric acid composition can be injected into aqueduct or line 24 carrying return flush fluid (shown as 42 in FIG. 2) that has been used to flush alleys 14. The sulfuric acid composition forms a mixture with the flush fluid 42 in aqueduct 24 to flush the manure separator 24 to clean it and improve its efficiency. This configuration can be used where the dairy producer, or other person, wants to improve the efficiency of the manure separator operation but does not wan to wash the alleys 14 with active sulfuric acid composition. In one embodiment, the sulfuric acid composition, with or without urea, can be pumped into aqueduct 24 via a pump truck or other mobile source of the composition. In the preferred embodiment, shown in FIG. 3, the composition is stored in storage tank 28 until it is needed to flush manure separator 27. When needed, the composition flows through hose 30 to pump 32, which pumps the composition through pressure line 34 to injector 36. Although placement of injector 36 next to or near manure separator 27 is preferred, injector 36 can be located anywhere upstream of manure separator 27 after the collection of the flush fluid from alleys 14. Backflow preventer 40 (shown in FIG. 2) can be used to prevent backflow. Once manure separator 27 is flushed with the sulfuric acid composition, the composition will (preferably) flow to lagoon 12 where it can treat the lagoon 12 as described above.

Figure 4:
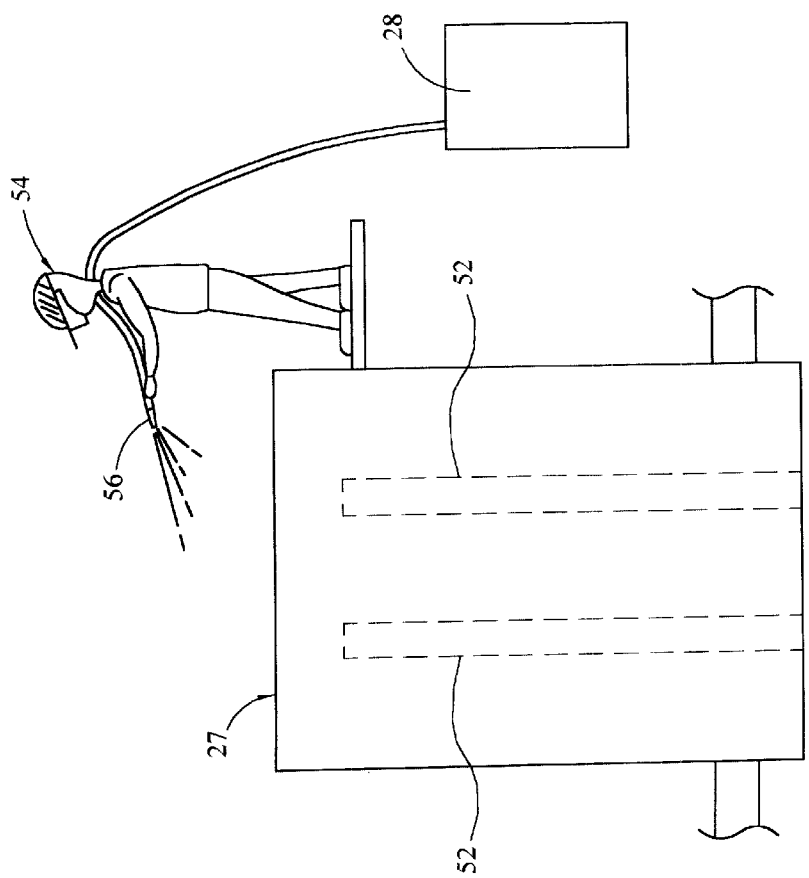
FIG. 4 is a side view of a manure separator being sprayed to clean the screens in a method of the present invention.

In another embodiment of the present invention, the sulfuric acid composition, with or without urea, can be used to spray the screens (shown as 52 on FIG. 4) of the manure separator 27. An operator 54 having the appropriate personal protective equipment (including clothing, gloves, goggles, etc.) and spray equipment 56, positions himself in front of the manure separator 27 and sprays the composition onto the screens 52 to wash any manure, algae and other material build-up off screens 52 to improve the efficiency of the manure separator operation. Once sprayed onto the screens 52, the composition flows into the manure separator 27 where it is mixed with the flush fluid 42. After the spraying operation is completed, the mixture of the sulfuric acid composition and flush fluid 42 is flushed into the lagoon 12 to assist in the treatment of lagoon 12, as described above. If desired, the spraying operation can include combining a quantity of flush fluid 42 from upstream of the manure separator 27 with the sulfuric acid composition to form a mixture prior to the spraying to provide a spray material that is safer to handle than the composition alone.

Figure 5:
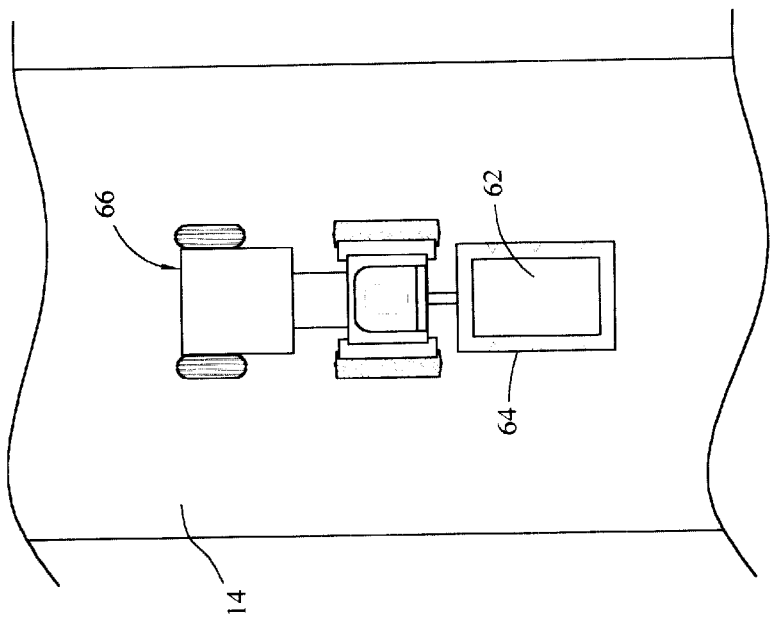
FIG. 5 is a plan view of a tractor pulling a spray mechanism through a livestock alley to spray the alley with a sulfuric acid composition.

In the embodiment shown in FIG. 5, a quantity of the sulfuric acid composition, with or without urea, is stored in a storage tank 62 that is operatively connected to a fluid delivery apparatus 64. The tank 62 and fluid delivery apparatus 64 can be a self-propelled unit or it can be configured to be towed behind another vehicle, such as tractor 66 in FIG. 5. The sulfuric acid composition is delivered to the entire surface of the livestock alley 14 by the fluid delivery apparatus 64, either by allowing the composition to flow from the apparatus 64 onto the alley 14 or by spraying the composition onto the alley 14. In the preferred embodiment, the fluid delivery apparatus 64 is a spray rig that is suitable for spraying the composition onto the alley 14. Once sprayed onto the alley 14, the composition is allowed to soak for a sufficient period of time for it to react with the manure and algae accumulated on the alley 14 so as to dissolve that material which is dissolvable and loosen the other material from the surface of the alley 14. The inventors have found that a period of time of fifteen minutes to one hour is usually sufficient to effectively clean the alley 14. After the soaking period is completed, the alley receives a hydraulic flush of water to remove the residue sulfuric acid composition and manure from the concrete alley 14. The flush water containing the sulfuric acid composition is then flushed to the lagoon 12, where it helps in neutralizing the pH of the lagoon 12. Once the alley 14 is flushed, the animals can be released into the treated area, which will be much less slippery than when covered with manure, algae and other materials. The method of cleaning the alley 14 described above, will typically need to be done every three to four months, or as often as needed, to prevent build-up that can endanger the animals.

While there is shown and described herein certain specific alternative forms of the invention, it will be readily apparent to those skilled in the art that the invention is not so limited, but is susceptible to various modifications and rearrangements in design and materials without departing from the spirit and scope of the invention as set forth in the claims.

What is claimed is:

1. A method for treating an agricultural manure treatment system in confined animal feeding operations having a lagoon, a fluid line and at least one livestock alley, comprising the steps of:

storing a composition comprising sulfuric acid and urea in a storage tank;

pumping a quantity of said composition from said storage tank into a stream of flush fluid disposed in the fluid line;

forming a mixture of said composition and said flush fluid in said fluid line;

flushing the livestock alley with said mixture; and delivering said mixture to the lagoon.

2. The method of claim 1 further comprising the step of monitoring the pH of the lagoon prior to the step of pumping a quantity of said composition.

3. The method of claim 2, wherein said quantity of said composition is sufficient to maintain the pH of the lagoon between approximately 6.5 and 7.0.

4. The method of claim 1 further comprising the step of adding a quantity of fresh water to the lagoon to maintain the dissolved oxygen content of the water in the lagoon at a level sufficient to prevent odors.

5. The method of claim 1 further comprising the step of circulating the water in the lagoon to maintain the dissolved oxygen content of the water in the lagoon at a level sufficient to prevent odors resulting from the formation of excess hydrogen sulfide.

6. The method of claim 1, wherein the step of pumping said quantity of said composition is controlled by a timer.

7. The method of claim 1, wherein said quantity of said composition is injected into or near the center of said stream of flush fluid.

8. A method for treating an agricultural manure treatment system in confined animal feeding operations having a lagoon, a fluid line, at least one livestock alley and a manure separator, comprising the steps of:

injecting a quantity of a sulfuric acid composition into a stream of flush fluid disposed in the fluid line immediately upstream of the manure separator;

forming a mixture of said composition and said flush fluid in said fluid line; and flushing the manure separator with said mixture.

9. The method of claim 8 further comprising the step of storing said composition in a storage tank prior to said injecting step.

10. The method of claim 8, wherein said sulfuric acid composition further comprises urea.

11. The method of claim 8 further comprising the step of delivering said mixture to the lagoon after said flushing step.

12. The method of claim 8, wherein a pump is utilized for said injecting step.

13. The method of claim 8, wherein said step of injecting said quantity of said composition includes injecting said quantity of said composition into or near the center of said stream of flush fluid.

14. The method of claim 13, wherein said step of injecting said quantity of said composition is performed by an injector attached to the fluid line.

15. The method of claim 14, wherein said injector includes a backflow prevention valve for preventing flow of flush fluid through said injector.

16. A method for treating an agricultural manure treatment system in confined animal feeding operations having a lagoon for storing a fluid, a fluid line, at least one livestock alley and a manure separator having one or more screens, comprising the steps of:

spraying a quantity of a composition comprising sulfuric acid onto the screen; and flushing said composition through the fluid line.

17. The method of claim 16, wherein said spraying step is manually performed.

18. The method of claim 16, wherein said flushing step utilizes a quantity of flush fluid disposed in said fluid line.

19. The method of claim 16, wherein said flushing step flushes said composition to the lagoon.

20. A method for treating an agricultural manure treatment system in confined animal feeding operations having a lagoon, a fluid line and at least one livestock alley, comprising the steps of:

storing a composition comprising sulfuric acid in a storage tank operatively connected to a fluid delivery apparatus;

placing a quantity of said composition from said storage tank onto the livestock alley;

soaking said quantity of said composition on the livestock alley for a sufficient period of time for said composition to react with manure and algae accumulated on the livestock alley; and flushing the livestock alley with a quantity of flush water.

21. The method of claim 20, wherein said composition further comprises urea.

22. The method of claim 20, wherein said fluid delivery apparatus is a sprayer.

23. The method of claim 22, wherein said placing step comprises spraying said quantity of said composition onto the livestock alley.

24. The method of claim 20, wherein said quantity of flush water flushes said composition to the lagoon.

25. The method of claim 24, wherein said composition assists in maintaining the pH of the lagoon between approximately 6.5 and 7.0.

* * * * *